United States Patent

Boston et al.

[11] Patent Number: 6,041,263
[45] Date of Patent: Mar. 21, 2000

[54] METHOD AND APPARATUS FOR SIMULATING AND OPTIMIZING A PLANT MODEL

[75] Inventors: Joseph F. Boston, Bedford, Mass.; Ian Boys, Letchworth Herts, United Kingdom

[73] Assignee: Aspen Technology, Inc., Cambridge, Mass.

[21] Appl. No.: 08/997,056

[22] Filed: Oct. 1, 1997

Related U.S. Application Data

[60] Provisional application No. 60/027,730, Oct. 1, 1996.

[51] Int. Cl.[7] .......................... G05B 13/04; G05B 13/02; G05B 17/02
[52] U.S. Cl. .................................. 700/32; 700/1; 700/2; 700/5; 700/60; 700/61; 700/62; 700/121; 709/213
[58] Field of Search ............................... 434/69; 364/152, 364/578, 528.01, 149, 150, 151; 700/1, 2, 5, 60, 61, 62, 121, 32; 709/213

[56] References Cited

U.S. PATENT DOCUMENTS

| | | | |
|---|---|---|---|
| 4,975,865 | 12/1990 | Carrette et al. | 364/139 |
| 5,257,363 | 10/1993 | Shapiro et al. | 395/500 |
| 5,301,317 | 4/1994 | Lohman et al. | 395/600 |
| 5,367,449 | 11/1994 | Manthey | 364/152 |
| 5,448,442 | 9/1995 | Farag | 361/24 |
| 5,448,681 | 9/1995 | Khan | 395/11 |
| 5,666,297 | 9/1997 | Britt et al. | 364/578 |
| 5,757,678 | 5/1998 | Leeke | 364/578 |

*Primary Examiner*—William Grant
*Assistant Examiner*—Iván Calcaño
*Attorney, Agent, or Firm*—Hamilton, Brook, Smith & Reynolds, P.C.

[57] ABSTRACT

The present invention is directed to a method for simulating and optimizing a plant model. The plant model having a multiplicity of equipment models for a desired processing plant and a multiplicity of local property models for the material components within the plant includes providing a set of initial values for each property model in a data storage area. A first set of coefficients in each property model is determined. A set of equations representing the equipment models and property models, wherein the property models having a complementarity formulation, are executed simultaneously by the digital processor by using the first set of coefficients to determine a second set of coefficients in each property model. The second set of coefficients are stored in the data storage area. The set of equations representing the equipment models and property models are executed simultaneously by the digital processor by utilizing the second set of coefficients from the data storage area to determine values of the processing plant model. The determined values of the processing plant model are stored in the data storage area. The method can also be used for simulating a dynamic plant model.

5 Claims, 1 Drawing Sheet

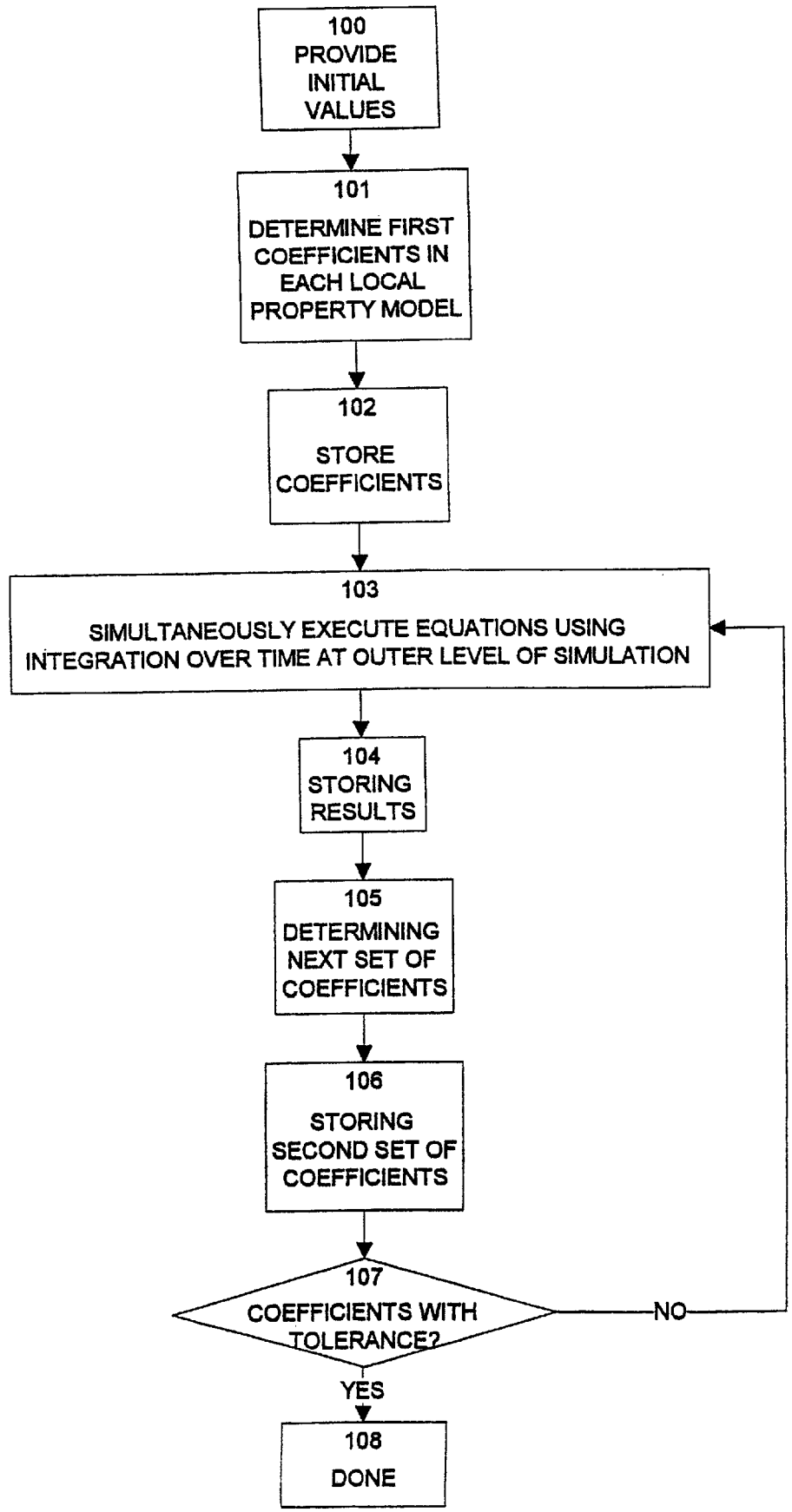

METHOD AND APPARATUS FOR SIMULATING AND OPTIMIZING A PLANT MODEL

RELATED APPLICATION

The present application claims priority to copending U.S. Provisional Patent application Ser. No. 60/027,730, filed on Oct. 1, 1996, the teachings of which are herein incorporated by reference.

BACKGROUND OF THE INVENTION

Process engineering involves the design of a wide variety of processing plants and processes carried out therein. Such processes include, but are not limited to, chemical, petrochemical, refining, pharmaceutical, and polymer industries. In process engineering, the use of computer based models to develop and evaluate new processes, design and retrofit plants, and optimize the operation of existing plants is rapidly becoming a standard. At every stage of process design, development and operation, rigorous models generated by process simulation software systems can be used to make better engineering and business decisions.

In a process simulation software system, the performance of a process industry plant in which there is a continuous flow of materials and energy through a network of process units is simulated. The process unit can include equipment, such as distillation columns, retaining vessels, heating units, pumps, conduits, etc. Typically, the processing simulation software features computer models that allow process engineers to simulate the operation of various pieces of equipment used in a proposed or existing manufacturing process. The end results from the simulation software system provide a display of the simulated performance of the plant under various conditions and estimate of the capital and operating cost of the plant and its profitability.

Generally, simulation and optimization of a process plant model is carried out by one of two fundamentally different approaches. They are sequential modular simulation of the plant model, with an optimization algorithm ("optimization block") adjusting the optimization variables after each converged simulation of the complete plant model and, second, simultaneous solution of the entire plant model, which solves the plant model and optimizes its conditions at the same time. These approaches are discussed in U.S. Pat. No. 5,666,297, issued to Britt et al. on Sep. 9, 1997, the teachings of which are incorporated herein by reference.

However, there is a need for an improved method for simulating and optimizing a processing plant model in a digital processor.

SUMMARY OF THE INVENTION

The present invention is directed to a method for simulating and optimizing a plant model, the plant model having a multiplicity of equipment models for a desired processing plant and a multiplicity of local property models for the material components within the plant.

The method includes providing a set of initial values for each unknown variable in the plant model in a data storage area. A first set of coefficients in each local property model based on the set of initial values is determined by the digital processor. The coefficients are stored in the data storage area. A set of equations representing the equipment models and local property models, wherein the equipment models having a complementarity flash formulation, are executed simultaneously by the digital processor by using the first set of coefficients to determine a second set of values for the plant model. The second set of values for the plant model are stored in the data storage area. A second set of coefficients in each set of local property model are determined. The second set of coefficients are stored in the data storage area. The steps can be repeated until the change in the values of the coefficients in the local property models falls within a predetermined tolerance.

In another embodiment, the invention includes a method for simulating a dynamic plant model by providing a set of initial values for each unknown variable in the dynamic plant model in a data storage area. A first set of coefficients in each local property model is determined by the digital processor based on the set of initial values. The coefficients are stored in the data storage area. A set of equations representing the equipment models and local property models, wherein said equipment models having a complementarity flash formulation, are executed simultaneously by the digital processor by using the previous set of coefficients to integrate the plant model over an incremental time period. The new set of values for the plant model are stored in the data storage area. A new set of coefficients are determined by the digital processor in each set of local property models. The new set of coefficients are stored in the data storage area. The method is continued until a desired simulation time period has elapsed for simulating the dynamic plant model.

The invention has an advantage that includes having a single, unchanging set of equations that is applied to flash calculations.

DESCRIPTION OF THE DRAWING

FIG. 1:

The FIGURE is a flowchart of the processing steps of the method.

DETAILED DESCRIPTION OF THE INVENTION

The features and details of the apparatus of the invention will now be more particularly described and pointed out in the claims. It will be understood that the particular embodiments of the invention are shown by way of illustration and not as limitations of the invention. The principal features of this invention can be employed in various embodiments without departing from the scope of the invention.

A method has been discovered which allows with a computer for the robust and real-time solution of large process models without the loss of accuracy which would normally be required to achieve this. This is achieved by the invention of a complementarity flash formulation and combining it with the use of local properties.

The present invention is intended to be used as a part of the software architecture in a computer software system for modeling, simulation, parameter estimation, data reconciliation and optimization of desired plants in a process industries, such as chemical, petrochemical, refining, polymers, plastics, etc. One such process modeling software and interface thereto is described in U.S. Pat. No. 5,008,810, issued to Kessel et al. on Apr. 16, 1991, the teachings of which are incorporated herein by reference.

In general, a computer software system embodying the present invention is operated on a digital processor typically in a user-interactive manner. As such, the digital processor is coupled to input/output devices, such as a keyboard and monitor. The software system is basically formed of (i) a sequential modular procedure, (ii) simultaneous simulator/ optimizer, (iii) model interface as the operating/executable parts, and (iv) plant model file as a shared main storage area for the working parts.

In the conventional equations for determining the amount and compositions of the vapor and liquid phases actually present, given a mixture of unknown phases, a constraint equation is applied. The constraint can be one of three options: (1) the sum of the vapor mole fractions is unity; (2) the sum of the liquid mole fractions is unity; or (3) the sums of the vapor and liquid mole fractions are equal. However, none of these constraints are valid over the whole range if it is allowed that the mixture can range from liquid only, through both vapor and liquid, to vapor only. In such a case, the constraint must be switched from (2) to (3) to (1) as the conditions change. However, a direct approach to switching is not possible, because the correct constraint to apply is only known once the solution is known, but the solution cannot be determined unless the correct constraint is applied. A trial and error approach can be applied, but this is not suitable for an efficient, real time solution of the equations.

In the present invention, a new solution has been found by combining complementarity with the conventional flash equations. Complementarity allows the constraint to be relaxed automatically, and as an integral part of the equations, whenever the vapor or liquid phase disappears. By this means, a single, unchanging set of equations is applied to the flash calculation which can be solved robustly and efficiently by conventional equation solving techniques.

In the conventional approach to dynamic simulation, an appropriate set of non-linear differential and algebraic equations (DAEs) is numerically integrated, by means of an iterative process to solve for each integration step. When high accuracy is required, many of the equations to be solved involve complex physical property calculations which can be expensive to compute. This makes the real-time solution of the equations difficult to achieve for problems of realistic size.

To improve the simulation speed without loss of accuracy, simplified property models are fitted to the rigorous model at each integration step in a completely automatic way, as part of the overall computational procedure. By this means, the simplified models are used within the iterative process for solving each integration step, but at each new step the rigorous model is applied to give accurate results for that integration step.

Local property approach to equation based simulation approach can be applied to many types of simulation run, including steady state, dynamic, initialization and optimization. The general calculation procedure is given first, and then it is explained how the details of the procedure are modified to cover different types of simulation.

A model of a chemical process consists of a set of equations which can be separated into two broad categories: the representation of the process equipment and the representation of the thermodynamic and physical properties of the fluids flowing through the equipment. These two categories of equations can be termed the equipment models and the property models. Together, they form the process model. The individual properties which need to be calculated in the property models include enthalpy, density, fugacity (K-values) and entropy. In the case of a dynamic simulation, the equipment models consist of a set of differential and algebraic equations, customarily known as a DAE system.

The local property approach is applicable to the calculation of properties in a rigorous simulator. In a rigorous simulator, the property models are based on complex sets of equations derived from fundamental thermodynamic principles, which at the lowest level rest on empirical models of fundamental fluid behaviors, such as equations of state.

To calculate the properties in a rigorous simulator requires a complex and extensive set of computations with many branches, and many variations depending on the component set and physical conditions existing in the simulation. As a result, these property computations are not traditionally made by solving a set of equations at the outer level of the simulator, but instead they are directly computed by a set of nested computer subroutines. This traditional approach is accurate, but it suffers from two problems. Firstly, because the equation solver at the top level is iterative, many calls to the property subroutines must be made to converge the iterations. Because the property subroutines are complex, there is a heavy computational load which dramatically slows the simulation. Secondly, because the property subroutines themselves use iteration, there is numerical noise in the results which decreases the robustness of convergence in the outer level of the simulator.

The essence of the local properties approach is to represent the complex and varied property computations by a set of simple and unvarying equations which can be solved at the top level of the simulator, without the loss of accuracy which would normally result from this. This leads to a very significant increase in speed and robustness of the simulation compared to the traditional approach.

Consider that the system is at some initial point in the solution of the process model. This means that all variables in the model have an initial value, which may or may not correspond to a correct solution of the equations. In particular, values are present for the variables on which the properties of fluids depend, such as temperature, pressure and composition.

In a first step 100 in FIG. 1, to start the simulation, some calls to the rigorous property system are made using the initial values, such as temperature and pressure, as inputs. As a result of these calls, information is provided which allows the coefficients in the local property models to be determined (Steps 101/102). Additional details of the local models are provided below. In a second step, the complete set of equations for the equipment models and the local property models are solved simultaneously (Steps 103/104), using the local property coefficients determined in the previous step. This solution of the process model is carried out in the normal equation based simulation environment. In a third step given this new solution for the complete process model, a new set of temperatures, pressures and compositions is available. Using these, a new set of coefficients in the local property models is determined (Steps 105/106), by making calls to the rigorous property system as with the first step. In a fourth step (e.g., Step 107 in FIG. 1), the process is now repeated from the second step for as many times as is desired.

Some specific details of the above general calculation procedure differ slightly according to whether the simulation is to be steady state or dynamic. In the case of dynamic simulations, the second step represents the integration of the complete set of differential and algebraic equations over a suitable period of time. This period of time can be adjusted according to specific simulation requirements, but is generally quite short relative to the total duration of the simulation. Depending on the integration method chosen, the second step can consist of many iterative solutions of the equipment models in the simulation, always using the local property models and coefficients as determined in the previous step (first or third). It is always possible to choose the period of time in the second step such that the solution of the complete system is sufficiently accurate for engineering purposes.

In the case of steady state, initialization and optimization simulations, the second and third steps are repeated one after the other until the complete system is converged. In this case, the second step is not an integration over time, but an improved estimate of the true solution of the process model. The second and third steps are repeated until, for example, the change in the values of all the coefficients in the local property models is less than some tolerance, at which point the iteration is stopped.

In a process simulation, the required thermodynamic and physical properties are calculated for fluids containing a mixture of one or more chemical components. These fluids can be either vapor or liquid, with vapor and liquid often occurring together. The properties to be represented by local models include enthalpy, density, fugacity (K-values) and entropy. Enthalpy, density and entropy are needed as properties of the mixture, while K-values are needed for each individual component.

Typical forms of the local property models which have been found to work well are described below. However, the invention is not limited to these specific forms.

Vapor enthalpy can be represented as $$h_{v,mix} = \Sigma h_{v,i} y_i \qquad (1)$$

$$h_{v,i} = A_{hv,i} + B_{hv,i} T + C_{hv,i} P \qquad (2)$$

where the terms are defined as $h_{v,mix}$: Vapor molar specific enthalpy of mixture
$h_{v,i}$: Partial molar specific enthalpy of component i in mixture
$y_i$: Mole fraction of component i in mixture
$A_{hv,i}$: Coefficient in local property model
$B_{hv,i}$: Coefficient in local property model
$C_{hv,i}$: Coefficient in local property model
T: Temperature of mixture
P: Pressure of mixture.

Liquid enthalpy can be represented as $$h_{l,mix} = \Sigma h_{l,i} x_i \qquad (3)$$

$$h_{l,i} = A_{hl,i} + B_{hl,i} T \qquad (4)$$

where the terms are defined as $h_{l,mix}$: Liquid molar specific enthalpy of mixture
$h_{l,i}$: Partial molar specific enthalpy of component i in mixture
$x_i$: Mole fraction of component i in mixture
$A_{hl,i}$: Coefficient in local property model
$B_{hl,i}$: Coefficient in local property model
T: Temperature of mixture.

Vapor density can be represented as $$\rho_v = MP/ZRT \qquad (5)$$

$$Z = A_{\rho,v} + B_{\rho,v} T + C_{\rho,v} P \qquad (6)$$

where the terms are defined as $\rho_v$: Vapor density of mixture
M: Molecular weight of mixture
P: Pressure of mixture
Z: Compressibility of mixture
R: Ideal gas constant
T: Temperature of mixture
$A_{\rho,v}$: Coefficient in local property model
$B_{\rho,v}$: Coefficient in local property model
$C_{\rho,v}$: Coefficient in local property model.

Liquid density can be represented as $$\rho_l = M/v_l \qquad (7)$$

$$v_l = A_{v,i} + B_{v,i} T \qquad (8)$$

where the terms are defined as $\rho_l$: Liquid density of mixture
M: Molecular weight of mixture
$v_l$: Liquid molar volume of mixture
$A_{v,i}$: Coefficient in local property model
$B_{v,i}$: Coefficient in local property model
T: Temperature of mixture.

K-Values can be represented as $$K_i/C_{K,i} = (1/P) \exp(A_{K,i} + B_{K,i}/T) \qquad (9)$$

where the terms are defined as $K_i$: K-value of component i in mixture
T: Temperature of mixture
P: Pressure of mixture
$A_{K,i}$: Coefficient in local property model
$B_{K,i}$: Coefficient in local property model
$C_{K,i}$: Coefficient in local property model.

Vapor entropy can be represented as $$S_{v,mix} = \Sigma S_{v,i} y_i \qquad (10)$$

$$S_{v,i} = A_{sv,i} + B_{sv,i} \ln T + C_{sv,i} \ln P - R \ln y_i \qquad (11)$$

where the terms are defined as $S_{v,mix}$: Vapor molar entropy of mixture
$S_{v,i}$: Partial molar entropy of component i in mixture
$y_i$: Mole fraction of component i in mixture
$A_{sv,i}$: Coefficient in local property model
$B_{sv,i}$: Coefficient in local property model
$C_{sv,i}$: Coefficient in local property model
T: Temperature of mixture
P: Pressure of mixture
R: Ideal gas constant.

The coefficients in the local property models can be directly calculated using information obtained from calls to the underlying rigorous property subroutines available within the simulator. To fit the coefficients, the information required consists of the properties themselves, and the temperature, pressure and composition derivatives. With this information available, a direct mathematical procedure can then be used to calculate the values of the coefficients.

The complementarity flash formulation is a way to represent an equilibrium flash directly as equations in a rigorous equation based simulator, while allowing one or more phases to be absent from the solution when required. It is applicable to both two phase and three phase flashes. It particularly allows local property models to be used directly as part of the flash calculations.

When representing the behavior of items of equipment in a process model, it is often required to compute the equilibrium separation between the vapor and liquid contained in the equipment. This calculation is commonly known as an equilibrium flash calculation. The result of the flash calculation depends directly on the physical properties of the vapor and liquid involved, and therefore these properties are closely involved in the calculations. When considering one vapor phase and one liquid phase, the result of the flash calculation can lie in one of three regions, which are: (1) all vapor, (2) both vapor and liquid in equilibrium, or (3) all liquid.

At the beginning of an equilibrium flash calculation, it is not generally known which one of the three regions listed above contains the solution. Therefore, in the traditional approach to flash calculations, the procedure begins by assuming that the solution could lie in any of the three regions, and making some preliminary calculations to find out which one applies. The calculations then continue down one of three different branches, solving different equations, depending on the result of the preliminary test. Owing to the sequential nature of this calculation procedure, it is traditionally implemented as one or more computer subroutines.

In a rigorous equation based simulator, the traditional approach to the calculation of an equilibrium flash suffers from the same disadvantages as the direct calculation of thermodynamic and physical properties. Namely, there is an excessive computational load and a decrease in robustness of solution, when solving the outer level equations which make up the process equipment models.

The part of the invention described here is a way to represent the equilibrium flash directly as a single set of equations in the outer level of the equation based simulator, giving a significant gain in speed and robustness of solution compared to traditional methods. The gain is particularly evident when local property models are used as part of the flash calculations, a feature encompassed by this invention.

It is the particular property of these equations that the same, unvarying set of equations can be used, whether the final solution consists of just a vapor phase, vapor and liquid phases, or just a liquid phase. There is no requirement to know in advance where the solution lies, and no requirement to switch between different solution branches as with traditional methods.

The calculation procedure for the complementarity flash formulation for two phases consists of a set of equations which are valid in all regions of the solution, specifically vapor alone, both vapor and liquid, and liquid alone. For three phases, a similar set of equations exists and the same principle applies.

The set of equations for the equilibrium flash is represented in the outermost level of the equation based simulator, alongside the equations for the process equipment and the equations for the local properties. All these equations taken together represent the complete process model. The complete set of process model equations is then solved simultaneously by the equation based simulation software. The solution process itself can be by any standard means, such as a Newton-Raphson iteration.

Within the complete set of equations for the process model, the set of flash equations can be and usually is included many times. Each instance will represent the equilibrium within a particular item of process equipment, or the equilibrium within a part of such an equipment item.

It is a property of the set of equations for the equilibrium flash that convergence is found to be rapid and robust, so the equation based simulation software need not be restricted to one particular package.

The set of equations which can make up the complementarity flash formulation are as follows:

$$z_i = \alpha . x_i + \beta . y_i \quad (i=1 \ldots n) \tag{12}$$

$$h = \alpha . h_l + \beta . h_v \tag{13}$$

$$y_i = K_i . x_i \quad (i=1 \ldots n) \tag{14}$$

$$\Sigma y_i + \beta' = \Sigma x_i + \alpha' \tag{15}$$

$$\alpha + \beta = 1 \tag{16}$$

$$h_l = h_l(T, P, x) \tag{17}$$

$$h_v = h_v(T, P, y) \tag{18}$$

$$K_i = K_i(T, P, x, y) \tag{19}$$

$$\beta' = \begin{cases} -\beta^* : \beta^* < 0 \\ 0 : \beta^* \geq 0 \end{cases} \tag{20}$$

$$\beta = \begin{cases} 0 : \beta^* < 0 \\ \beta^* : 0 \leq \beta^* \leq 1 \\ 1 : \beta^* > 1 \end{cases} \tag{21}$$

$$\alpha' = \begin{cases} 0 : \beta^* \leq 1 \\ \beta^* - 1 : \beta^* > 1. \end{cases} \tag{22}$$

In the above equations, the terms are defined as follows:
$z_i$: Overall mole fraction of component i in mixture
$x_i$: Mole fraction of component i in liquid phase
$y_i$: Mole fraction of component i in vapor phase
$\alpha$: Total mole fraction of liquid phase
$\beta$: Total mole fraction of vapor phase
h: Overall molar specific enthalpy of mixture
$h_l$: Molar specific enthalpy of liquid phase
$h_v$: Molar specific enthalpy of vapor phase
$K_i$: K-value of component i in mixture
T: Overall temperature of mixture
P: Overall pressure of mixture
x: Vector of liquid phase mole fractions for all components
y: Vector of vapor phase mole fractions for all components
$\alpha'$: Complement of liquid fraction
$\beta'$: Complement of vapor fraction
$\beta^*$: Auxiliary variable representing pseudo-vapor fraction
$h_l(\ )$: General liquid enthalpy function, but preferentially the local property function described above
$h_v(\ )$: General vapor enthalpy function, but preferentially the local property function described above
$K_i(\ )$: General K-value function for equilibrium mixture, but preferentially the local property function described above.

In the above set of equations, if the last three equations (Eq. 20–22) involving $\beta^*$ are removed, and the variables $\alpha'$ and $\beta'$ are removed by setting them to zero, then the remaining equations are the standard governing equations for a two phase flash. However, this conventional set of equations is not valid and cannot be solved if either liquid or vapor phase is absent from the solution. Whenever the solution contains only liquid or only vapor, the conventional equations can be modified to make them valid, but each case requires a different modification, and which modification to make cannot be determined until the location of the solution is known. In this invention, the new set of equations shown herein has been found which are valid and can be used in every case without modification.

In this new set of equations, the variables $\alpha'$, $\beta'$ and $\beta^*$ have a special function in allowing the system of equations to converge to the correct solution, even if there should be no liquid present (superheated vapor) or no vapor present (sub-cooled liquid). When solving the equations, the following bounds are applied to certain of the variables:

$$0 \leq \alpha \leq 1 \tag{23}$$

$$0 \leq \beta \leq 1 \tag{24}$$

$$0 \leq \alpha' \leq 1 \tag{25}$$

$$0 \leq \beta' \leq 1 \tag{26}$$

$$-1 \leq \beta^* \leq 2. \tag{27}$$

In the solution, whenever there is no liquid present, $\alpha$ becomes zero and $\alpha'$ becomes greater than zero. Likewise, when there is no vapor present, $\beta$ becomes zero and $\beta'$ becomes greater than zero. The last three equations are designed so that only one of $\alpha$ and $\alpha'$ can become non-zero at a time. Similarly, only one of $\beta$ and $\beta'$ can become non-zero at a time. This ensures that the solution to the complete set of equations is valid. There are alternative ways of ensuring the condition that only one of $\alpha$ and $\alpha'$, $\beta$ and $\beta'$ can be non-zero at the same time, for example the equations $$\alpha.\alpha'=0 \tag{28}$$

$$\beta.\beta'=0. \tag{29}$$

These alternatives are also included within the scope of this invention.

The following examples will further illustrate the invention, but are not to be construed as limiting its scope.

ASP96-01pA

-20-

```
     CODE EXAMPLE 1

MODEL DRUMFV

?set KVAL_EXP=1 ?end

{HEADER
 5     NAME:         DRUMFV
       TYPE:         SPEEDUP Model
       PURPOSE:      To model a vertical flash drum
       DESCRIPTION:

This is a model of a vertical drum. It models reverse flows in all streams
10     but assumes that any reverse flow in the feed stream will come from the
       drum vapour space.

The entire contents of the drum are assumed to be in equilibrium.

The volume of the drum takes into account the volume of the heads.
       The liquid level calculation ignores the effect of the heads, modelling
15     the drum as if it had flat ends.

The thermal capacity of the vessel and the effect of heat loss to the
       surroundings are modeled.

There is a liquid 'overflow' which prevents the drum from overfilling.

When the liquid inventory in the drum falls below 'LL_LOC + HEEL' the value
20     of the connection THROT_O, begins to fall from its normal value of 100,
       reaching 0 when the volume fraction remaining in the drum is 'HEEL'. This
       connection can be used to throttle a valve on the liquid from the drum to
       simulate the effect of loss of NPSH on a downstream pump.

ENDHEADER}

25 HELP

Vertical flash drum.

INPUT  F1 : Liquid to drum              : MAINSTREAM
     OUTPUT V1 : Vapour stream from drum     : MAINSTREAM
     OUTPUT L1 : Liquid stream from drum     : MAINSTREAM 30   CONNECTION T_O       : Temperature for indication
     CONNECTION THROT_O   : Output flow restriction connection
```

ASP96-01pA

-21-

```
        CONNECTION LEVEL_O      : Level in drum - measurement
        CONNECTION P_O          : Pressure in drum - measurement
        CONNECTION Q_I          : External heat input Preferred sets:
 5    WITHIN
        drum_id      = ?          { Drum internal diameter           (m)     }
        drum_length  = ?          { Drum cylindrical length          (m)     }
        head_ratio   = 2.0        { Drum head major/minor axis ratio (-)    }
        mass_metal   = ?          { Mass of metal in shell           (kg)    }
10  #   liq_level    =            { Liquid level                     (m)     }
    #   Q_icn        = 0.0        { External duty                    (GJ/hr) }
        Parameters:
          NOCOMP
          V_UAMB                  { U for wall to ambient  { W/m2.K } }
15        V_UWALL                 { U for process to wall  { W/m2.K } }
          V_CPMETAL               { Cp of metal            { Gj/kg.K } }
          LEV_H                   { Overflow location, fraction of volume }
          LEV_L                   { Low liquid level, fraction of volume }
          LEV_LL                  { Liquid heel, fraction of volume }
20        K_OFLO                  { Overflow capacity parameter }
     $ENDHELP {
       Model use notes 1. Drum dimensions ( drum_id, drum_length, head_ratio )

25     The drum is modelled as a cylinder with two semi-elipsoidal dished ends.

drum_id is the drum internal diameter in metres drum_length is the length of cylindrical portion of the drum as measured
          along the straight portion of the wall, excluding the dished ends, in
          metres.

30        head_ratio is the the major axis of the dished end divided by the minor
          axis. An elipsoid has three characteristic dimension ( e.g. radii ) but
          because the dished ends fit onto a cylinder, two of these are the same
          and are equal to the radius of the cylinder. The third characteristic
          radius of the head is the depth of the head, measured along the axis of
35        the drum, from the end of the cylindrical portion to the end of the head.
          Thus the head_ratio is the radius of the drum divided by the depth of the
          head. If the actual dimensions of the drum are not available, a good
          estimate is 2.

2. V_UWALL, V_UAMB

40     These numbers are used to calculate the heat flow from the liquid in
       the drum to the vessel shell and from the shell to the environment.

The equations used are of the form

Heat flow  =   Heat transfer coefficient (U)
                             * Area (A)
45                           * Temperature difference The heat transfer coefficients V_UWALL and V_UAMB have default values which
```

ASP96-01pA

-22- will give reasonable results in most cases.

The heat flow from the liquid to the shell is scaled in proportion to the fraction of the drum volume occupied by liquid, to approximate the relationship between the heat transfer and the wetted area.

5    3. V_CPMETAL, mass_metal

These numbers are used to represent the thermal capacity of the metal in the vessel.

V_CPMETAL has a default value which is correct for stainless steel.

The user must estimate and set 'mass_metal'.

10   4. LEV_H, K_OFLO

There is an 'overflow' which prevents the drum from overfilling.
This is controlled by parameters LEV_H and K_OFLO. The default values are 0.95 and 5500, which mean that the overflow begins when the liquid volume exceeds 0.95 of the drum volume and increases linearly
15   to reach a rate of 5500 kmol/h for each m3 of excess volume.

5. LEV_L, LEV_LL

When the liquid inventory in the drum falls below LEV_L the value of the connection THROT_O begins to fall from its normal value of 100, reaching 0 when the volume fraction remaining in the drum is LEV_LL.
20   The default values of LEV_L and LEV_LL are 0.05 and 0.001 respectively.

This connection can be used to throttle a valve on the liquid from the drum to simulate the effect of loss of NPSH on a downstream pump.

6. Tips for achieving steady state convergence

Steady state convergence of this model should be relatively straightforward.
25   If there are difficulties, then preset x, y, Kval, mi and T to reasonable values.

}
SET

```
        NOCOMP,                              # number of components
30      V_CP_TO_NSM2  =      1.0E-3,         # (N-S/M2) / cP
        V_GRAVITY     =      9.81E-5,        # bar/(m-kg/m3)
        V_HR_TO_SEC   =      3600.0,         # s / hr
        V_KJ_TO_GJ    =      1.0E-6,         # GJ / kJ
        V_MM_TO_M     =      1.0E-3,         # m / mm
35      V_NEG         =      -1.0E10,        # large negative number
        V_ONE         =      1.0,            #
        V_POS         =      1.0E10,         # large positive number
        V_W_TO_GJHR   =      3.6E-6,         # (GJ/hr) / W
        V_ZERO        =      0.0,            #
40      V_100         =      100.0,          #
        V_PI          =      3.1415926536,   # Value of Pi to 10 dps
        V_UAMB        =      *10.0,          # U for wall to ambient  { W/m2.K  }
        V_UWALL       =      *400.0,         # U for process to wall  { W/m2.K  }
        V_CPMETAL     =      *0.5E-6,        # Cp of metal            { GJ/kg.K }
```

ASP96-01pA

-23-

```
            LEV_H        =  *0.95,             # Fr of drum @ overflow
            LEV_L        =  *0.05,             # Low level as fr. of volume
            LEV_LL       =  *0.001,            # Amount left in drum when 'empty'
            K_OFLO       = *5500.0             # Overflow scale const
 5      TYPE

#   Input F1 :
            #
            F_in          AS       flow_mol         # Stream molar flow
10          P_in          AS       pressure         # Stream pressure
            z_in_f        AS       ARRAY (NOCOMP)   # Stream forward molar composition
                                   OF molefraction  #
            h_in_f        AS       enth_mol         # Stream forward enthalpy
            z_in_r        AS       ARRAY (NOCOMP)   # Stream reverse molar composition
15                                 OF molefraction  #
            h_in_r        AS       enth_mol         # Stream reverse enthalpy

#   Output V1 :
            #
20          V_out         AS       flow_mol         # Stream molar flow
            Pv_out        AS       pressure         # Stream pressure
            y_out_f       AS       ARRAY (NOCOMP)   # Stream forward molar composition
                                   OF molefraction  #
            hv_out_f      AS       enth_mol         # Stream forward enthalpy
25          y_out_r       AS       ARRAY (NOCOMP)   # Stream reverse molar composition
                                   OF molefraction  #
            hv_out_r      AS       enth_mol         # Stream reverse enthalpy

#   Output L1 :
30          #
            L_out         AS       flow_mol         # Stream molar flow
            Pl_out        AS       pressure         # Stream pressure
            x_out_f       AS       ARRAY (NOCOMP)   # Stream forward molar composition
                                   OF molefraction  #
35          hl_out_f      AS       enth_mol         # Stream forward enthalpy
            x_out_r       AS       ARRAY (NOCOMP)   # Stream reverse molar composition
                                   OF molefraction  #
            hl_out_r      AS       enth_mol         # Stream reverse enthalpy

40      # Connections:
            #
            T_ocn           AS     temperature      # Connection for liquid temperature
            throttle_ocn    AS     percent          # Connection for throttling the outlet
                                                    # flow as the vessel becomes empty
45          level_ocn       AS     length           # Connection for the liquid level
            P_ocn           AS     pressure         # Connection for the drum pressure
            Q_icn           AS     heat_flow        # External heat input

# Internal:
```

ASP96-01pA

-24-

```
     #
     # Drum dimensions

*drum_id        AS      length          # Drum i.d. (m)
         *drum_length    AS      length          # Drum cylindrical length (m)
  5      *head_ratio     AS      notype          # Drum head major/minor axis ratio A_wall          AS      area            # Estimate of drum wall area ( m2 )
         vol_drum        AS      volume          # Volume of drum, including heads
         fr_vol          AS      fraction        # Volume fraction full of liquid
         liq_level       AS      length          # Level of liquid in drum (m)
 10      max_liq_vol     AS      volume          # Maximum allowed liquid volume (m3)
         effective_length
                         AS      length          # Effective length of drum (m)

Drum conditions

Overall

15      T               AS      temperature     # Drum temperature
         P               AS      pressure        # Pressure at surface of liquid in
         drum
         mi              AS ARRAY(NOCOMP)
                            OF holdup_mol        # Component molar holdups
 20      Mtot            AS      holdup_mol      # Total molar holdup
         E               AS      energy          # Total energy holdup

Vapour space vol_v           AS      volume          # Vapour volume
         mw_v            AS      molweight       # Vapour molecular weight
 25      rho_v           AS      dens_mol        # Vapour molar density

Liquid space vol_l           AS      volume          # Liquid volumn
         vol_l_x         AS      volume          # Unbounded liquid volume
         mw_l            AS      molweight       # Liquid molecular weight
 30      rho_l           AS      dens_mol        # Liquid molar density

Flash calculation vf              AS      fraction        # Vapour fraction
         lf              AS      fraction        # Liquid fraction
         lf_0            AS      fraction        # Complementary variable to lf
 35      vf_0            AS      fraction        # Complement of vapour fraction
         vf_star         AS      phase_fraction  # Unconstrained vapour fraction
         Kval            AS ARRAY(NOCOMP)
                            OF K_value           # K-values
         x_un            AS    ARRAY (NOCOMP)    # Un-normalised liquid composition
 40                         OF molefraction      #

Shell metal and heat loss

T_amb           AS      temperature     # Ambient temperature
         T_wall          AS      temperature     # Temperature of vessel shell
         Q_wall          AS      heat_flow       # Heat flow from liquid to shell
 45      Q_amb           AS      heat_flow       # Heat flow from shell to environment
```

ASP96-01pA

-25-

```
        *mass_metal    AS       mass            # Mass of metal in shell
     # Flow variables F_in_f        AS       flow_mol        # Forward flow component of stream
         F_in_r        AS       flow_mol        # Reverse flow component of stream
   5     V_out_f       AS       flow_mol        # Forward flow component of stream
         V_out_r       AS       flow_mol        # Reverse flow component of stream
         L_out_f       AS       flow_mol        # Forward flow component of stream
         L_out_r       AS       flow_mol        # Reverse flow component of stream
         O_flow        AS       flow_mol        # Flow from 'overflow'
  10 #
     #     Constants in property correlations:
     #
         TTK           AS       loprop          # Convert T to Kelvin
         MWC           AS ARRAY (NOCOMP)
  15                      OF    loprop          # Component molecular weights
         AHV           AS ARRAY (NOCOMP)
                          OF    loprop          # Vapour enthalpy 'A' coefficents
         BHV           AS ARRAY (NOCOMP)
                          OF    loprop          # Vapour enthalpy 'B' coefficents
  20     CHV           AS ARRAY (NOCOMP)
                          OF    loprop          # Vapour enthalpy 'C' coefficents
         AHL           AS ARRAY (NOCOMP)
                          OF    loprop          # Liquid enthalpy 'A' coefficents
         BHL           AS ARRAY (NOCOMP)
  25                      OF    loprop          # Liquid enthalpy 'B' coefficents
         AVV           AS       loprop          # Vapour specific volume 'A' coeff
         BVV           AS       loprop          # Vapour specific volume 'B' coeff
         CVV           AS       loprop          # Vapour specific volume 'C' coeff
         AVL           AS       loprop          # Liquid specific volume 'A' coeff
  30     BVL           AS       loprop          # Liquid specific volume 'B' coeff
         AK            AS ARRAY (NOCOMP)
                          OF    loprop          # K-value 'A' coefficents
         BK            AS ARRAY (NOCOMP)
                          OF    loprop          # K-value 'B' coefficents
  35     CK            AS ARRAY (NOCOMP)
                          OF    loprop          # K-value 'C' coefficents

STREAM

INPUT    F1   F_in, P_in, z_in_f, h_in_f, z_in_r, h_in_r
         OUTPUT   V1   V_out, Pv_out, y_out_f, hv_out_f, y_out_r, hv_out_r
  40     OUTPUT   L1   L_out, Pl_out, x_out_f, hl_out_f, x_out_r, hl_out_r CONNECTION    THROT_O    throttle_ocn
         CONNECTION    LEVEL_O    level_ocn
         CONNECTION    P_O        P_ocn
         CONNECTION    T_O        T_ocn
  45     CONNECTION    Q_I        Q_icn EQUATION
     #
     #
     #   Material balance
  50 #
         $mi    =   F_in_f * z_in_f + F_in_r * y_out_f
```

ASP96-01pA

-26-

```
                - V_out_f * y_out_f  -  V_out_r * y_out_r
                - L_out_f * x_out_f  -  L_out_r * x_out_r
                - O_flow  * x_out_f ;

Mtot = SIGMA ( mi ) ;
 5  #
    #   Energy balance
    #
        $E   =    F_in_f  * h_in_f    +  F_in_r  * hv_out_f
                - V_out_f * hv_out_f  -  V_out_r * hv_out_r
10              - L_out_f * hl_out_f  -  L_out_r * hl_out_r
                - O_flow  * hl_out_f
                + Q_icn
                - Q_wall ;

E  = Mtot * (lf * hl_out_f + vf * hv_out_f) ;
15  #
    #   Flash equations: Complementarity formulation
    #
        mi  = Mtot * (lf * x_un + vf * y_out_f) ;
        y_out_f = Kval * x_un ;
20      vf + lf = 1.0 ;
        SIGMA (y_out_f) = SIGMA (x_un) + lf_0;
        x_un = x_out_f * (1 - lf_0) ;

# Vessel metal dynamics and heat losses
25  #
        A_wall = V_PI * drum_id * (drum_length + drum_id / 2) ;

Q_wall = (T - T_wall)   * fr_vol * V_UWALL * A_wall * V_W_TO_GJHR ;
        Q_amb  = (T_wall - T_amb) * V_UAMB * A_wall * V_W_TO_GJHR ;

$T_wall * mass_metal * V_CPMETAL = Q_wall - Q_amb ;

30  #
    # Pressures
    #
        P_in   = P ;
        Pv_out = P ;
35      Pl_out = P + liq_level * rho_l * mw_l * V_GRAVITY ;

# Volumes
    #
        effective_length = drum_length + 2.0/3.0 * drum_id / head_ratio ;
40      vol_drum  = V_PI * drum_id * drum_id / 4 * effective_length ;

vol_l_x * rho_l = lf * Mtot ;
        vol_v   * rho_v = vf * Mtot ;
        vol_drum = vol_v + vol_l ;

fr_vol = vol_l / vol_drum ;
45      max_liq_vol = vol_drum * LEV_H ;

# Levels
```

ASP96-01pA

-27-

```
    #
      liq_level = fr_vol * effective_length ;
    #
    # Liquid 'overflow'
 5  #
      O_flow / K_OFLO = (vol_l_x - vol_l) ;

# Stream equalities
    #
10    z_in_r    = x_out_f ;
      h_in_r    = hl_out_f ;

# Connections
    #
15    T_ocn = T ;
      P_ocn = P ;
      level_ocn = liq_level ;

# Property calculations
20  #
      rho_v         = P / ((T+TTK) * (AVV + BVV * T + CVV * P)) ;
      rho_l * (AVL + BVL * T) = 1.0 ;
    ?IF KVAL_EXP=1 ?then
      Kval / CK = EXP(AK + BK / (T+TTK)) / P ;
25  ?else
      LOG (Kval * P) = AK + BK / (T+TTK) + CK * P ;
    ?endif

PROCEDURE

30  # Define forward and reverse flow components
    #
      ( F_in_f  ) limit ( F_in,  V_ZERO, V_POS  )
      ( F_in_r  ) limit ( F_in,  V_NEG,  V_ZERO )
      ( V_out_f ) limit ( V_out, V_ZERO, V_POS  )
35    ( V_out_r ) limit ( V_out, V_NEG,  V_ZERO )
      ( L_out_f ) limit ( L_out, V_ZERO, V_POS  )
      ( L_out_r ) limit ( L_out, V_NEG,  V_ZERO )

#  Liquid volume limit
40  #
      ( vol_l ) limit ( vol_l_x, V_ZERO, max_liq_vol )

# Low liquid level outlet flow shutoff
    #
45    ( throttle_ocn ) ramp ( fr_vol, LEV_LL, LEV_L, V_ZERO, V_100 )

#  Flash complementarity
    #
      ( vf_0, vf, lf_0 ) split2p ( vf_star )
```

ASP96-01pA

-28-

```
     #
     #  Properties
     #
        ( TTK,  MWC,
 5        AHV,  BHV,  CHV,
          AHL,  BHL,
          AVV,  BVV,  CVV,
          AVL,  BVL,
          AK,   BK,   CK )   prop_corr_2hd
10                              ( T, P, x_out_f, y_out_f, lf_0, V_ZERO ) INPUT F1,
     TEAR

Vapour phase property calculations ( hv_out_f       )  prop_calc_hv    ( T, P, y_out_f, AHV, BHV, CHV )
        ( mw_v           )  prop_calc_mw    (       y_out_f, MWC           )

15 # Liquid phase property calculations ( hl_out_f       )  prop_calc_hl    ( T,    x_out_f,    AHL, BHL   )
        ( mw_l           )  prop_calc_mw    (       x_out_f,    MWC        )

( T_amb          )  get_param       ( "TAMB"                       )

20 #  End of MODEL DRUMFV
     #

CODE EXAMPLE 2

CHEADER
     C
25 C  NAME:          DPE_GP2HD
     C  TYPE:          Fortran Subroutine, SPEEDUP Procedure
     C  PURPOSE:       Localised properties for two phase calculations
     C  DESCRIPTION:
     C
30 C  Return localised property correlations for vapour and liquid
     C  enthalpy and density, and K-values, given a fully defined set of input
     C  conditions.
     C
     C  Input specification is temperature, pressure, vapour mole fractions,
35 C  liquid molefractions.
     C
     C  Localised correlations are:-
     C
     C  HV = sum { y(i) * [AHV(i) + T * BHV(i) + P * CHV(i)] }
40 C
     C  HL = sum { x(i) * [AHL(i) + T * BHL(i)] }
     C
     C  volV(mole) = (T+CTK) / P * (AVV + BVV * T + CVV * P)
     C
45 C  volL(mole) = AVL + BVL * T
     C
     C  K(i) = exp { [AK(i) + BK(i) / (T+CTK) + CK(i) * P] } / P
     C
     CENDHEADER
```

ASP96-01pA

-29-

```
            SUBROUTINE DPE_GP2HD (T, P, XF, NX, YF, NY, LF0, VF0,
           &                     CTK, MW, N14,
           &                     AHV, N1, BHV, N2, CHV, N3,
           &                     AHL, N4, BHL, N5,
 5         &                     AVV, BVV, CVV,
           &                     AVL, BVL,
           &                     AK, N8, BK, N9, CK, N10,
           &                     IFAIL, ISTR,
           &                     WS, NWS,
10         &                     ICALL)

IMPLICIT NONE

INTEGER     NX, NY, IFAIL, ISTR, ICALL
            INTEGER     N1, N2, N3, N4, N5, N8, N9, N10, N14
            DOUBLE PRECISION    T, P, XF(NX), YF(NY), LF0, VF0
15          DOUBLE PRECISION    CTK, MW(NX)
            DOUBLE PRECISION    AHV(NX), BHV(NX), CHV(NX)
            DOUBLE PRECISION    AHL(NX), BHL(NX)
            DOUBLE PRECISION    AVV, BVV, CVV
            DOUBLE PRECISION    AVL, BVL
20          DOUBLE PRECISION    AK(NX), BK(NX), CK(NX)
            INTEGER     NWS
            DOUBLE PRECISION    WS(NWS)

C+
      C     Arguments:
25    C
      C     Name    Type    Direction   Dimension    Function
      C     T       DP      I           -            Temperature
      C     P       DP      I           -            Pressure
      C     XF      DP      I           NX           Liquid component mole fractions
30    C     NX      I       I           -            Number of components
      C     YF      DP      I           NY  (= NX)   Vapour component mole fractions
      C     NY      I       I           -            Number of components
      C     LF0     DP      I           -            Complement of liquid fraction
      C     VF0     DP      I           -            Complement of vapour fraction
35    C     CTK     DP      O           -            Offset for T from Centigrade to
      C                                              Kelvin
      C     MW      DP      O           -            Component molecular weights
      C     AHV     DP      O           NX           Vapour enthalpy coefficents
      C     BHV     DP      O           NX           -
40    C     CHV     DP      O           NX           -
      C     AHL     DP      O           NX           Liquid enthalpy coefficients
      C     BHL     DP      O           NX           -
      C     AVV     DP      O           -            Vapour specific volume coefficients
      C     BVV     DP      O           -            -
45    C     CVV     DP      O           -            -
      C     AVL     DP      O           -            Liquid specific volume coefficients
      C     BVL     DP      O           -            -
      C     AK      DP      O           NX           Vapour/liquid K-value coeffients
      C     BK      DP      O           NX           -
50    C     CK      DP      O           NX           -
      C     IFAIL   I       M           -            Failure flag
      C     ISTR    I       I           -            Current stream number
      C     WS      DP      M           NWS          Working storage
      C     NWS     I       I           -            At least 3
55    C     ICALL   I       I           -            Type of call (pre-call, other)
      C
```

ASP96-01pA

-30-

```
      C-
      C
      C  Parameters
      C
   5       DOUBLE PRECISION   PN_MIN
           PARAMETER (PN_MIN = 1.0D4)
           INTEGER   MAX_COMPS
           PARAMETER (MAX_COMPS = 50)
           INTEGER SS, OPT, EST, DYN, INI
  10       PARAMETER (SS = 1, OPT = 2, EST = 3, DYN = 4, INI = 5)
      C
      C  Local declarations
      C
           DOUBLE PRECISION   LF0_LIM, VF0_LIM
  15       INTEGER   KBASE, I, SWITCH
           INTEGER   IBSTR, IBIDX, IBORDR, IBOPST, IBIDXS, IBORDS
           DOUBLE PRECISION   TK, PN, CHG, CPN
           DOUBLE PRECISION   DOUBLE_COUNTER, OLD_T
           INTEGER   COUNTER
  20       EQUIVALENCE (COUNTER, DOUBLE_COUNTER)
           DOUBLE PRECISION   RDUMMY
           CHARACTER*10 CDUMMY
           INTEGER   JFLAG, IDUMMY
           DOUBLE PRECISION   LIQ_FILT, VAP_FILT
  25       DOUBLE PRECISION   AHL1, BHL1
           DOUBLE PRECISION   AHV1, BHV1, CHV1
           DOUBLE PRECISION   AK1, BK1, CK1
           DOUBLE PRECISION   AVV1, BVV1, CVV1
           DOUBLE PRECISION   AVL1, BVL1
  30       INTEGER   IR (MAX_COMPS)
           DOUBLE PRECISION   DT_TOL
           DOUBLE PRECISION   COMP_MIN INTEGER   MODE
           SAVE      MODE, COMP_MIN
  35  C
      C  Property system include files
      C
           INCLUDE 'saipar.inc'
           INCLUDE 'saiwso.inc'
  40       INCLUDE 'saijso.inc'
           INCLUDE 'gpiout.inc'
           INCLUDE 'prplus.cmn'
           INCLUDE 'rglob.cmn'
           INCLUDE 'plex.cmn'
  45  C
      C  External functions
      C
           DOUBLE PRECISION SAIT2K, SAIP2N, SAIJ2G
           INTEGER   DPE_IRANDINT
  50       EXTERNAL  DPE_IRANDINT, SAIT2K, SAIP2N, SAIJ2G
      C
      C  Perform pre-call initialisations
      C
           IF (ICALL .EQ. 1) THEN
  55  D      write(*,*) 'GP2HD: init'
      C
      C  Error if number of components exceeds dimension of local array
      C
```

ASP96-01pA

-31-

```
              IF (NX .GT. MAX_COMPS) THEN
                 WRITE (*,*)
                 WRITE (*,*) 'PROP_CORR_2H: TOO MANY COMPONENTS'
                 WRITE (*,*)
 5               IFAIL = 4
                 RETURN
              END IF
       C
       C  Get the run mode (SS, DYN, etc.)
10     C
              CALL SPRQST ('MODE    ', MODE, RDUMMY, CDUMMY, JFLAG)
       C
       C  Initialise the update counter and old temperature on dynamic runs
       C
15            IF (MODE .EQ. DYN) THEN
                 CALL DPE_GET_DIAG (12, RDUMMY, COUNTER)
                 COUNTER = COUNTER + DPE_IRANDINT (COUNTER)
                 OLD_T = T
                 WS(1) = DOUBLE_COUNTER
20               WS(2) = OLD_T
              END IF
       C
       C  Get trace component limit
       C
25            CALL DPE_GET_DIAG (41, COMP_MIN, IDUMMY)
       C
       C  Initialise the first call flag
       C
              WS(3) = 0.0
30     C
       C  End of pre-call initialisations
       C
              END IF
       D      write(*,*) 'GP2HD: main'
35     C
       C  Check external switch for update mechanism on dynamic runs.  Choices
       C  are 1=always/0=never/2=on a deadband.
       C
              IF (MODE .EQ. DYN .AND. ICALL .NE. 1) THEN
40               CALL DPE_GET_DIAG (10, RDUMMY, SWITCH)
                 IF (SWITCH .EQ. 2) THEN
                    DOUBLE_COUNTER = WS(1)
                    OLD_T = WS(2)
                    COUNTER = COUNTER - 1
45                  CALL DPE_GET_DIAG (22, DT_TOL, IDUMMY)
                    IF (ABS (T-OLD_T) .LT. DT_TOL .AND. COUNTER .GT. 0) THEN
                       WS(1) = DOUBLE_COUNTER
                       RETURN
                    END IF
50                  CALL DPE_GET_DIAG (12, RDUMMY, COUNTER)
                    COUNTER = COUNTER + DPE_IRANDINT (COUNTER)
                    OLD_T = T
                    WS(1) = DOUBLE_COUNTER
                    WS(2) = OLD_T
55               ELSE IF (SWITCH .EQ. 0) THEN
                    RETURN
                 END IF
              END IF
       C
```

ASP96-01pA

-32-

```
      C  Set the stream number
      C
            CALL SAISST ( ISTR, IBSTR, IBIDX, IBORDR, IBIDXS, IBORDS,
           &              IBOPST, IFAIL )
 5          IF ( IFAIL .EQ. IFATAL ) GO TO 999
      C
      C  Print inputs if LPRINT > NORMAL
      C
            IF ( LPRINT .GT. NORMAL ) THEN
10            CALL SAIPIP( 'GP2HD',T, 1, P, 1, IB(IBIDX), IB(IBORDR),
           &              XF, NX )
              CALL SAIPIP( 'GP2HD',T, 0, P, 0, IB(IBIDX), IB(IBORDR),
           &              YF, NY )
            ENDIF
15    C
      C  Obtain the declared/set streamwide KBASE value
      C
            KBASE = IB ( IBSTR + IOKBAS )
      C
20    C  Convert temperature and pressure to SI units
      C  Temp, T -> K
      C  Pressure, P -> N/m2
      C
            TK = SAIT2K ( T )
25          PN = SAIP2N ( P )
      C
      C  Guard against negative pressures
      C
            PN = MAX (PN, PN_MIN)
30    C
      C  Normalise the vapour and liquid mole fractions
      C
            CALL SAIF2X ( NX, XF, B(IBWSX), IFAIL )
            IF (IFAIL .NE. IOK) GO TO 999

35          CALL SAIF2X ( NY, YF, B(IBWSY), IFAIL )
            IF (IFAIL .NE. IOK) GO TO 999
      C
      C  Convert SPEEDUP ordered components to ASPEN PLUS order
      C
40          CALL SAISAO ( NX, IB(IBORDR), B(IBWSX), B(IBWAX) )
            CALL SAISAO ( NY, IB(IBORDR), B(IBWSY), B(IBWAY) )
      C
      C  Now get the local correlations
      C
45    D     write(*,*) 'call SA2HD'
            CALL DPE_SA2HD (TK, PN, NX,
           &               IB(IBIDX), B(IBWAX), B(IBWAY),
           &               IB(IBOPST), KBASE, B(IBJK09),
      C                                         |
50    C                                         MW
      C
           &               B(IBJK01), B(IBJK02), B(IBJK03),
      C                       |          |          |
      C                       AHV        BHV        CHV
55    C
           &               B(IBJK04), B(IBJK05),
      C                       |          |
      C                       AHL        BHL
```

ASP96-01pA

-33-

```
       C
              &                AVV1, BVV1, CVV1,
              &                AVL1, BVL1,
              &                B(IBJK06), B(IBJK07), B(IBJK08),
  5    C                        |          |          |
       C                        AK         BK         CK
       C
              &                IFAIL)
       C
 10    C  Skip out on error
       C
              IF (IFAIL .EQ. IFATAL) GO TO 999
       C
       C  Compute the unit conversion factors
 15    C
              CTK = SAIT2K ( 0.0D0 )
              CPN = SAIP2N ( 1.0D0 )
              CHG = SAIJ2G ( 1.0D0 )
       C
 20    C  Compute the order reversal vector
       C
              DO I = 1, NX
                 IR (IB (IBORDR + I - 1)) = I
              END DO
 25    C
       C  Compute the vapour and liquid filter constants
       C
       C
              VF0_LIM = MIN(VF0, 0.9999999D0)
 30           LF0_LIM = MIN(LF0, 0.9999999D0)

IF (MODE .EQ. SS .OR. MODE .EQ. INI) THEN
                 IF (WS(3) .GT. 0.0) THEN
                    WS(3) = WS(3) + 1
                    LIQ_FILT = EXP ( LF0/(LF0_LIM - 1.0) * WS(3))
 35                 VAP_FILT = EXP ( VF0/(VF0_LIM - 1.0) * WS(3))
                 ELSE
                    LIQ_FILT = 1.0
                    VAP_FILT = 1.0
                    WS(3) = 1.0
 40              END IF
              ELSE IF (MODE .EQ. DYN) THEN
                 CALL DPE_GET_DIAG (31, LIQ_FILT, IDUMMY)
                 LIQ_FILT = MAX (EXP (LF0/(LF0_LIM - 1.0)), LIQ_FILT)
                 CALL DPE_GET_DIAG (32, VAP_FILT, IDUMMY)
 45              VAP_FILT = MAX (EXP (VF0/(VF0_LIM - 1.0)), VAP_FILT)
              ELSE
                 LIQ_FILT = 1.0
                 VAP_FILT = 1.0
              END IF
 50    C
       C  Convert the property coefficients back to SPEEDUP order, adjust the
       C  units and filter them. Do not update if component less than COMP_MIN.
       C  Ensure precall always initialises correctly.
       C
 55           DO I = 1, NX

IF (ICALL .NE. 1) THEN
```

ASP96-01pA

-34-

```
              IF (YF(I).GT.COMP_MIN) THEN
                 CHV1 = B(IBJK03 + IR(I) - 1) * CHG * CPN
                 BHV1 = B(IBJK02 + IR(I) - 1) * CHG
                 AHV1 = B(IBJK01 + IR(I) - 1) * CHG + BHV1 * CTK

5               AHV(I) = AHV(I) + (AHV1 - AHV(I)) * VAP_FILT
                 BHV(I) = BHV(I) + (BHV1 - BHV(I)) * VAP_FILT
                 CHV(I) = CHV(I) + (CHV1 - CHV(I)) * VAP_FILT
              ENDIF

IF (XF(I).GT.COMP_MIN) THEN
10               BHL1 = B(IBJK05 + IR(I) - 1) * CHG
                 AHL1 = B(IBJK04 + IR(I) - 1) * CHG + BHL1 * CTK

AHL(I) = AHL(I) + (AHL1 - AHL(I)) * LIQ_FILT
                 BHL(I) = BHL(I) + (BHL1 - BHL(I)) * LIQ_FILT
                 IF (YF(I).GT.COMP_MIN) THEN
15                  CK1 = B(IBJK08 + IR(I) - 1)
                    BK1 = B(IBJK07 + IR(I) - 1)
                    AK1 = B(IBJK06 + IR(I) - 1) - LOG (CPN)

AK(I) = AK(I) + (AK1 - AK(I)) * LIQ_FILT
                    BK(I) = BK(I) + (BK1 - BK(I)) * LIQ_FILT
20                  CK(I) = CK1
                 ENDIF
              ENDIF
           ELSE
              CHV(I) = B(IBJK03 + IR(I) - 1) * CHG * CPN
25            BHV(I) = B(IBJK02 + IR(I) - 1) * CHG
              AHV(I) = B(IBJK01 + IR(I) - 1) * CHG + BHV(I) * CTK

BHL(I) = B(IBJK05 + IR(I) - 1) * CHG
              AHL(I) = B(IBJK04 + IR(I) - 1) * CHG + BHL(I) * CTK

CK(I) = B(IBJK08 + IR(I) - 1)
30            BK(I) = B(IBJK07 + IR(I) - 1)
              AK(I) = B(IBJK06 + IR(I) - 1) - LOG (CPN)
           ENDIF
     D     write (*,*) 'AK(',I,') = ',AK(I), LIQ_FILT
     D     write (*,*) 'BK(',I,') = ',BK(I), LIQ_FILT
35   D     write (*,*) 'CK(',I,') = ',CK(I), LIQ_FILT D     write (*,*) 'AHL(',I,') = ',AHL(I), LIQ_FILT
     D     write (*,*) 'BHL(',I,') = ',BHL(I), LIQ_FILT D     write (*,*) 'AHV(',I,') = ',AHV(I), VAP_FILT
     D     write (*,*) 'BHV(',I,') = ',BHV(I), VAP_FILT
40   D     write (*,*) 'CHV(',I,') = ',CHV(I), VAP_FILT

MW(I) = B(IBJK09 + IR(I) - 1)

D     write (*,*) 'MW(',I,') = ',MW(I)

END DO
     C
45   C  Specific volume, pressure from N/m2 to bar, temperature from K to C
     C
        BVV1 = BVV1 / CPN
        AVV1 = AVV1 / CPN + BVV1 * CTK
```

ASP96-01pA

-35-

```
              AVL1 = AVL1 + BVL1 * CTK

AVL = AVL + (AVL1 - AVL) * LIQ_FILT
              BVL = BVL + (BVL1 - BVL) * LIQ_FILT
              AVV = AVV + (AVV1 - AVV) * VAP_FILT
    5         BVV = BVV + (BVV1 - BVV) * VAP_FILT
              CVV = CVV + (CVV1 - CVV) * VAP_FILT
        C
        C  Print results if LPRINT > NORMAL
        C
   10 999    CONTINUE IF ( LPRINT .GT. NORMAL .OR. IFAIL .NE. IOK) THEN
                 CALL SAIPOP ( 'GP2HD', 'Completion status', DBLE (IFAIL) )
              ENDIF
        C
   15 C   The end.
        C
              RETURN
              END CODE EXAMPLE 3
   20 CHEADER
        C
        C  NAME:         DPE_SA2HD
        C  TYPE:         Fortran Subroutine, Properties Plus Access
        C  PURPOSE:      Localised properties for two phase calculations
   25 C  DESCRIPTION:
        C
        C  Return localised property correlations for vapour and liquid
        C  enthalpy and density, and K-values, given a fully defined set of input
        C  conditions.
   30 C
        C  Input specification is temperature, pressure, vapour mole fractions,
        C  liquid molefractions.
        C
        C  Localised correlations are:-
   35 C
        C  HV = sum { y(i) * [AHV(i) + T * BHV(i) + P * CHV(i)] }
        C
        C  HL = sum { x(i) * [AHL(i) + T * BHL(i)] }
        C
   40 C  volV(mole) = T / P * (AVV + BVV * T + CVV * P)
        C
        C  volL(mole) = AVL + BVL * T
        C
        C  K(i) = exp { [AK(i) + BK(i) / T + CK(i) * P] } / P
   45 C
        CENDHEADER SUBROUTINE DPE_SA2HD (T, P, NC, IDX, X, Y,
             &                     NBOPST, KBASE,
             &                     MWC,
   50        &                     AHV, BHV, CHV,
             &                     AHL, BHL,
             &                     AVV, BVV, CVV,
             &                     AVL, BVL,
```

ASP96-01pA

-36-

```
               &                      AK, BK, CK,
               &                      IFAIL)

IMPLICIT NONE

INTEGER         NC, IDX(NC), NBOPST(6), KBASE, IFAIL
 5             DOUBLE PRECISION   T, P, X(NC), Y(NC), MWC(NC)
               DOUBLE PRECISION   AHV(NC), BHV(NC), CHV(NC)
               DOUBLE PRECISION   AHL(NC), BHL(NC)
               DOUBLE PRECISION   AVV, BVV, CVV
               DOUBLE PRECISION   AVL, BVL
10             DOUBLE PRECISION   AK(NC), BK(NC), CK(NC)

C+
      C   Arguments:
      C
      C   Name      Type   Direction   Dimension    Function
15    C   T         DP     I           -            Temperature
      C   P         DP     I           -            Pressure
      C   NC        I      I           -            Number of components
      C   IDX       I      I           NC           Component index vector
      C   X         DP     I           NC           Liquid component mole fractions
20    C   Y         DP     I           NC           Vapour component mole fractions
      C   NBOPST    I      I           6            Option set vector
      C   KBASE     I      I           -            Enthalpy reference state
      C   MWC       DP     O           NC           Component molecular weights
      C   AHV       DP     O           NC           Vapour enthalpy coefficents
25    C   BHV       DP     O           NC           -
      C   CHV       DP     O           NC           -
      C   AHL       DP     O           NC           Liquid enthalpy coefficients
      C   BHL       DP     O           NC           -
      C   AVV       DP     O           -            Vapour specific volume coefficients
30    C   BVV       DP     O           -            -
      C   CVV       DP     O           -            -
      C   AVL       DP     O           -            Liquid specific volume coefficients
      C   BVL       DP     O           -            -
      C   AK        DP     O           NC           Vapour/liquid K-value coefficients
35    C   BK        DP     O           NC           -
      C   CK        DP     O           NC           -
      C   IFAIL     I      M           -            Failure flag (not used)
      C
      C-
40    C
      C   Property system include files
      C
               INCLUDE 'saipar.inc'
               INCLUDE 'global.cmn'
45             INCLUDE 'plex.cmn'
      C
      C   References to externally calculated results in common
      C
               DOUBLE PRECISION  RMISS, HIGMX(3), HVMX(3), HLMX(3)
50             DOUBLE PRECISION  DHVMX(3), DHLMX(3)
               INTEGER   IPOFF1(400) , IPOFF3(100)

COMMON / USER   / RMISS
               COMMON / IGMX   / HIGMX
               COMMON / MPVAP  / HVMX
55             COMMON / MPLIQ  / HLMX
```

ASP96-01pA

-37-

```
              COMMON / SPVAP  / DHVMX
              COMMON / SPLIQ  / DHLMX
              COMMON / IPOFF1 / IPOFF1
              COMMON / IPOFF3 / IPOFF3
     5  C
        C   References to scratch space in PLEX for working storage
        C
              INTEGER   LPHIL, LPHIV, LDPHLDT, LDPHVDT, LPHIL1, LPHIV1
              INTEGER   LDHLDX, LPX 10        COMMON /DPE_WNC2/ LPHIL
              COMMON /DPE_WNC3/ LPHIV
              COMMON /DPE_WNC4/ LDPHLDT
              COMMON /DPE_WNC5/ LDPHVDT
              COMMON /DPE_WNC6/ LPHIL1
    15        COMMON /DPE_WNC7/ LPHIV1
              COMMON /DPE_WNC8/ LDHLDX
              COMMON /DPE_WNC9/ LPX
        C
        C   References to externally calculated results in the PLEX
    20  C
              INTEGER ZMW, HIG, LMW, LHIG
        C
        C   Local variables
        C
    25        INTEGER   KH, KH1, KPHI, KPHI1, KV, KV1
              INTEGER   I, KER, NSAVE
              INTEGER   J
              DOUBLE PRECISION    TSQ, PL, PV, DPV, DPL
        C     DOUBLE PRECISION    XMW
    30        DOUBLE PRECISION    HV, HV1, VV, VV1, DHVDT, HVMX1, HVMX1
              DOUBLE PRECISION    DVV, DHV, DHV1, DDHV
              DOUBLE PRECISION    HL, VL, DHLDT, DVL
              DOUBLE PRECISION    HVIG, DHVIG
              DOUBLE PRECISION    DKDT, DKDP
    35        DOUBLE PRECISION    DUM, K
              DOUBLE PRECISION    HL1, HLSUM DOUBLE PRECISION    XH2O, HL_H2O, DHLDT_H2O, PHI_H2O_INF
              INTEGER   IH2O, NBSAVE
              LOGICAL   FREE_WAT 40        CHARACTER*8  COMPID
              CHARACTER*12 ALIAS
              CHARACTER*32 CNAME
              CHARACTER*8  OUTID
        C
    45  C   Parameters
        C
              DOUBLE PRECISION    K_MAX, K_MIN
              PARAMETER (K_MAX = 1.0D6, K_MIN = 1.0D-6)

DOUBLE PRECISION    DEL_X, DEL_P
    50        PARAMETER (DEL_X = 0.001, DEL_P = 0.001)
        C
        C   Statement Functions
        C
              ZMW(I)   = LMW     + I
```

ASP96-01pA

-38-

```
         HIG(I)   = LHIG    + I
   C
   C  Initialise common workspace
   C
 5       CALL DPE_INIT_LOCP()

C
   C  Set Plex Offsets
   C
         LMW  = IPOFF1(306)
10       LHIG = IPOFF3(35)

C
   C  Set up initial values
   C
         NSAVE = NBOPST(6)
15       KH1   = 1
         KPHI1 = 1
         KV1   = 1
         KH    = 3
         KPHI  = 3
20       KV    = 3
         TSQ   = T * T
         PL    = (1 + DEL_P) * P
         PV    = (1 - DEL_P) * P
         DPL   = PL - P
25       DPV   = PV - P
   C
   C  Locate water in the component list
   C
         IH2O = 0
30       DO I = 1, NC
            CALL PPGNAM (IDX(I), COMPID, ALIAS, CNAME, OUTID)
            IF (COMPID .EQ. 'H2O') THEN
               IH2O = I
            END IF
35       END DO
   D     write (*,*) 'Water is: ',IH2O
   C
   C  Determine liquid molecular weight
   C
40 C     XMW = 0D0
         DO I = 1, NC
            MWC(I) = B(ZMW(IDX(I)))
   C        XMW = XMW + X(I) * MWC(I)
         END DO
45 C
   C  Determine ideal gas properties
   C
         CALL IDLGAS (T, Y, NC, IDX, LPDIAG, KBASE, 3, 0, 0, 0, 0,
      1               0, B(HIG(1)), DUM, DUM, B(HIG(NC+1)), DUM, DUM,
50    2               DUM, DUM, DUM, DUM, DUM, DUM, KER)
   C
   C  Initialise missing values
   C
         HIGMX(1) = RMISS
55       HIGMX(2) = RMISS
         DHVMX(1) = RMISS
```

ASP96-01pA

-39-

```
              DHVMX(2) = RMISS
      C
      C  Get vapour phase properties
      C
 5            CALL VMTHRM (T, PV, Y, NC, IDX, NBOPST, LPDIAG, KBASE, KPHI1,
             1             KH1, 0, 0, KV1, B(LPHIV1), HV1, DUM, DUM, VV1,
             2             DUM, DUM, DUM, DUM, DUM, KER)

HVMX1 = HVMX(1)
              DHVMX1 = DHVMX(1)

10            CALL VMTHRM (T, P, Y, NC, IDX, NBOPST, LPDIAG, KBASE, KPHI,
             1             KH, 0, 0, KV, B(LPHIV), HV, DUM, DUM, VV,
             2             B(LDPHVDT), DHVDT, DUM, DUM, DVV, KER)
      C
      C  Fix vapour specific volume correlation
15    C
              CVV = (VV + P * (VV1 - VV) / DPV) / T
              BVV = P * (DVV * T - VV) / TSQ
              AVV = P * VV / T - BVV * T - CVV * P
      C
20    C  Determine vapour enthalpy departure
      C
              IF (DHVMX(1) .NE. RMISS) THEN
                  DHV = DHVMX(1)
                  DHV1 = DHVMX1
25            ELSE IF (HIGMX(1) .NE. RMISS) THEN
                  DHV = HVMX(1) - HIGMX(1)
                  DHV1 = HVMX1 - HIGMX(1)
              ELSE
                  HVIG = 0.0
30                DO I = 1, NC
                      HVIG = HVIG + Y(I) * B(HIG(I))
                  END DO
                  DHV = HVMX(1) - HVIG
                  DHV1 = HVMX1 - HVIG
35            END IF
      C
      C  Determine temperature differential of departure
      C
              IF (DHVMX(2) .NE. RMISS) THEN
40                DDHV = DHVMX(2)
              ELSE IF (HIGMX(2) .NE. RMISS) THEN
                  DDHV = HVMX(2) - HIGMX(2)
              ELSE
                  DHVIG = 0.0
45                DO I = 1, NC
                      DHVIG = DHVIG + Y(I) * B(HIG(NC+I))
                  END DO
                  DDHV = HVMX(2) - DHVIG
              END IF
50    C
      C  Remove water from mole fraction vector so simulate separate water phase
      C
              IF (IH2O .GT. 0 .AND. NBOPST(6) .EQ. 1) THEN
                  XH2O = X(IH2O)
55                IF (XH2O .LT. 0.9999) THEN
                      FREE_WAT = .TRUE.
                      DO I = 1, NC
```

ASP96-01pA

-40-

```
                  X(I) = X(I) / (1.0 - XH2O)
               END DO
               X(IH2O) = 0.0
            ELSE
 5             FREE_WAT = .FALSE.
            END IF
         ELSE
            FREE_WAT = .FALSE.
         END IF
10 C
   C  Get liquid phase properties
   C
         NBOPST(6) = 3

CALL LMTHMY (T, PL, X, Y, NC, IDX, NBOPST, LPDIAG, KBASE, KPHI1,
15   1                0, 0, 0, 0, B(LPHIL1), DUM, DUM, DUM, DUM,
     2                DUM, DUM, DUM, DUM, DUM, KER)

CALL LMTHMY (T, P, X, Y, NC, IDX, NBOPST, LPDIAG, KBASE, KPHI,
     1                KH, 0, 0, KV, B(LPHIL), HL, DUM, DUM, VL,
     2                B(LDPHLDT), DHLDT, DUM, DUM, DVL, KER)

20 C
   C  Fix properties for free water if present
   C
         IF (FREE_WAT) THEN

NBSAVE = NBOPST(1)
25          NBOPST(1) = NBOPST(5)

PHI_H2O_INF = B(LPHIL+IH2O-1)

D        write (*,*) 'Water fug. coeff. before: ', PHI_H2O_INF

CALL LMTHMY (T, PL, 1D0, 1D0, 1, IDX(IH2O), NBOPST, LPDIAG,
     1                   KBASE, KPHI1,
30   2                   0, 0, 0, 0, B(LPHIL1+IH2O-1), DUM, DUM, DUM, DUM,
     3                   DUM, DUM, DUM, DUM, DUM, KER)

CALL LMTHMY (T, P, 1D0, 1D0, 1, IDX(IH2O), NBOPST, LPDIAG,
     1                   KBASE, KPHI,
     2                   KH, 0, 0, 0, B(LPHIL+IH2O-1), HL_H2O, DUM,DUM,DUM,
35   3                   B(LDPHLDT+IH2O-1), DHLDT_H2O, DUM, DUM, DUM, KER)

D        write (*,*) 'Water fug. coeff. after: ',B(LPHIL+IH2O-1)

NBOPST(1) = NBSAVE

IF (B(LPHIL+IH2O-1) .GE. XH2O * PHI_H2O_INF) THEN
   D           write (*,*) 'Single liquid phase.'
40             B(LPHIL+IH2O-1) = PHI_H2O_INF
            ELSE
   D           write (*,*) 'Two liquid phases.'
               DO I = 1, NC
                  IF (I .NE. IH2O) THEN
45                   B(LPHIL+I-1) = B(LPHIL+I-1) / (1.0-XH2O)
                     B(LPHIL1+I-1) = B(LPHIL1+I-1) / (1.0-XH2O)
                     B(LDPHLDT+I-1) = B(LDPHLDT+I-1) / (1.0-XH2O)
                  ELSE
```

ASP96-01pA

-41-

```
                    B(LPHIL+I-1) = B(LPHIL+I-1) / MAX (XH2O, 1D-8)
                    B(LPHIL1+I-1) = B(LPHIL1+I-1) / MAX (XH2O, 1D-8)
                    B(LDPHLDT+I-1) = B(LDPHLDT+I-1) / MAX (XH2O, 1D-8)
                  END IF
 5             END DO
           END IF

END IF
     C
     C  Determine liquid partial molar enthalpies
10   C
           HLSUM = 0

DO I = 1, NC

DO J = 1, NC
               IF (J .EQ. I) THEN
15                B(LPX+J-1) = (X(J) + DEL_X) / (1 + DEL_X)
               ELSE
                  B(LPX+J-1) = X(J) / (1 + DEL_X)
               END IF
             END DO

20           CALL ENTHL (T, P, B(LPX), NC, IDX, NBOPST, LPDIAG, KBASE,
         1              KH1, HL1, DUM, KER)

B(LDHLDX+I-1) = (HL1 * (1 + DEL_X) - HL) / DEL_X
             HLSUM = HLSUM +  B(LDHLDX+I-1)* X(I)

END DO
25   C
     C  Update water enthalpy with pure water properties
     C
           IF (FREE_WAT) THEN
     D        write (*,*) 'Water DHLDX before: ',B(LDHLDX+IH2O-1)
30            B(LDHLDX+IH2O-1) = HL_H2O
     D        write (*,*) 'Water DHLDX after: ',HL_H2O
              HL = HL * (1.0-XH2O) + HL_H2O * XH2O
              HLSUM = HLSUM * (1.0-XH2O) + HL_H2O * XH2O
              DHLDT = DHLDT * (1.0-XH2O) + DHLDT_H2O * XH2O
35         END IF NBOPST(6) = NSAVE
     C
     C  Fix liquid specific volume correlation
     C
40         BVL = DVL
           AVL = VL - BVL * T C
     C  Determine the coefficients in the enthalpy correlations
     C
45         DO I = 1, NC

CHV(I) = (DHV1 - DHV) / DPV

BHV(I) = B(HIG(NC+I)) + DDHV
             BHL(I) = DHLDT
```

ASP96-01pA

```
                  AHV(I) = B(HIG(I)) + DHV - BHV(I) * T - CHV(I) * P
                  AHL(I) = B(LDHLDX+I-1) + (HL - HLSUM) - BHL(I) * T

END DO
      C
    5 C  Determine the K-value coefficients
      C
            DO I = 1, NC K = B(LPHIL+I-1) / B(LPHIV+I-1)
                  DKDT = (B(LDPHLDT+I-1) - K * B(LDPHVDT+I-1)) /
   10       &                B(LPHIV+I-1)
                  DKDP = ((B(LPHIL1+I-1) - B(LPHIL+I-1)) / DPL
            &            - K * (B(LPHIV1+I-1) - B(LPHIV+I-1)) / DPV)
            &            / B(LPHIV+I-1)

C/IB    CK(I) = 1.0 / P + DKDP / MAX (K, 1D-10)
   15         BK(I) = - DKDT * TSQ / MAX (K, 1D-10)
              BK(I) = MIN (BK(I), -200.0D0)
              BK(I) = MAX (BK(I), -10000.0D0)

C/IB
              CK(I) = MIN (MAX (K_MIN, K), K_MAX)
   20 C/IB    AK(I) = LOG (K * P) - BK(I) / T - CK(I) * P
              IF (CK(I).LT.1D0) THEN
                 AK(I) = LOG (CK(I)*P) - BK(I) / T
                 CK(I) = 1D0
              ELSE
   25            AK(I) = LOG (P) - BK(I) / T
              ENDIF
            END DO
      C
      C  End of routine
   30 C
            RETURN
            END

CODE EXAMPLE 4

CHEADER
   35 C
      C  NAME:       DPE_P_PROP_CALC_HV
      C  TYPE:       Fortran Subroutine, SPEEDUP Procedure
      C  PURPOSE:    To compute vapour enthalpy
      C  DESCRIPTION:
   40 C
      C  Compute vapour mixture enthalpy by applying simple correlation for each
      C  component and summing.
      C
      C  Name in SPEEDUP is PROP_CALC_HV.
   45 C
      CENDHEADER SUBROUTINE  DPE_P_PROP_CALC_HV (T, P, Y, NY,
            &                AHV, N1, BHV, N2, CHV, N3,
            &                HV,
   50       &                IFL, ITYP,
```

ASP96-01pA

-43-

```
      &                   DERIV, NOUT, NIN,
      &                   ICALL)
       IMPLICIT NONE
   C
 5 C  Argument declarations
   C
       INTEGER NY, N1, N2, N3
       DOUBLE PRECISION T, P, Y(NY), AHV(N1), BHV(N2), CHV(N3), HV
       INTEGER IFL, ITYP, ICALL
10     INTEGER NOUT, NIN
       DOUBLE PRECISION DERIV (NOUT, NIN)

C+
   C     Arguments:
   C
15 C     Name    Type    Direction   Dimension   Function
   C     T       DP      I           -           Temperature
   C     P       DP      I           -           Pressure
   C     Y       DP      I           NY          Vapour mole fractions
   C     AHV     DP      I           N1          Array of A coefficients
20 C     BHV     DP      I           N2          Array of B coefficients
   C     CHV     DP      I           N3          Array of C coefficients
   C     HV      DP      O           -           Vapour mixture enthalpy
   C     IFL     INT     M           -           Failure code on return
   C     ITYP    INT     I           -           Input stream type (not used)
25 C     DERIV   DP      O           NOUT, NIN   Returned derivative array
   C     ICALL   INT     I           -           Call type
   C-

C
   C  Local declarations
30 C
       INTEGER I
   C
   C  Parameters
   C
35     DOUBLE PRECISION MIN_SUM
       PARAMETER (MIN_SUM = 1.0D-5)
   C
   C  Sum the mole fractions for normalisation
   C
40 C   YSUM = 0.0
   C       DO I = 1, NY
   C          YSUM = YSUM + Y(I)
   C       END DO
   C       YSUM = MAX (YSUM, MIN_SUM)
45 C
   C  Sum the enthalpy contributions for each component
   C
       IF (ICALL .EQ. 0 .OR. ICALL .EQ. 4) THEN
          HV = 0
50        DO I = 1, NY
   C         HV = HV + Y(I)/YSUM * (AHV(I) + BHV(I) * T + CHV(I) * P)
             HV = HV + Y(I) * (AHV(I) + BHV(I) * T + CHV(I) * P)
          END DO
       END IF
55 C
   C  Compute derivatives
   C
```

ASP96-01pA

-44-

```
              IF (ICALL .EQ. 3 .OR. ICALL .EQ. 4) THEN
                  DERIV (1, 1) = 0
                  DERIV (1, 2) = 0
                  DO I = 1, NY
 5                    DERIV (1, 1) = DERIV (1, 1) + Y(I) * BHV(I)
                      DERIV (1, 2) = DERIV (1, 2) + Y(I) * CHV(I)
                      DERIV (1, 2+I) = AHV(I) + BHV(I) * T + CHV(I) * P
                      DERIV (1, 2+NY+I) = Y(I)
                      DERIV (1, 2+2*NY+I) = Y(I) * T
10                    DERIV (1, 2+3*NY+I) = Y(I) * P
                  END DO
              END IF
       C
       C   End
15     C
              RETURN
              END

CODE EXAMPLE 5

CHEADER
20     C
       C   NAME:             DPE_P_SPLIT2P
       C   TYPE:             Fortran Subroutine, SPEEDUP Procedure
       C   PURPOSE:
       C   DESCRIPTION:
25     C
       C   vf_star is split into three components: vf_0, vf & lf_0.
       C
       C
       CENDHEADER
30            SUBROUTINE DPE_P_SPLIT2P (VF_STAR, VF_0, VF, LF_0,
              &                         IFL, ITYP, WS, NWS,
              &                         DERIV, NOUT, NIN,
              &                         ICALL )

IMPLICIT NONE
35     C
       C   Argument declarations
       C
              INTEGER            IFL, ITYP, NWS, NOUT, NIN, ICALL
              DOUBLE PRECISION VF_STAR
40            DOUBLE PRECISION VF_0, VF, LF_0
              DOUBLE PRECISION WS (NWS)
              DOUBLE PRECISION DERIV (NOUT, NIN)
       C+
       C   Arguments:
45     C
       C   Name      Type   Direction  Dimension   Function
       C   VF_STAR   DP     I          -           Multi phase ratio
       C   VF_0      DP     O          -           Sub cooled factor
       C   VF        DP     O          -           2 phase ratio
50     C   LF_0      DP     O          -           Super heated factor
       C   IFL       INT    M          -           Failure code on return
       C   ITYP      INT    I          -           Input stream type (not used)
       C   DERIV     DP     O          NOUT, NIN   Returned derivative array
       C   ICALL     INT    I          -           Call type
```

ASP96-01pA

-45-

```
      C    WS(1)         DP         I/O        -         Last non 2 phase flag
      C-
      C
      C Local variables
    5 C
            DOUBLE PRECISION  RDUMMY
            CHARACTER*10      CDUMMY
            INTEGER           RUNMODE, JFLAG, IDUMMY
            DOUBLE PRECISION  RUNTOL
   10       SAVE  RUNTOL
      C
      C Parameters
      C
            INTEGER SS, OPT, EST, DYN, INI
   15       PARAMETER (SS = 1, OPT = 2, EST = 3, DYN = 4, INI = 5)

C
      C Precall initialisations
      C
            IF (ICALL .EQ. 1) THEN
   20          CALL SPRQST ('MODE       ', RUNMODE, RDUMMY, CDUMMY, JFLAG)
               IF (RUNMODE .EQ. DYN ) THEN
                 CALL DPE_GET_DIAG(40, RUNTOL, IDUMMY)
               ELSE
                 RUNTOL = 0
   25          ENDIF
               IF ((VF_STAR .LT. 0.0) .OR.(VF_STAR .GT. 1.0))   THEN
                 WS(1) = 1
               ELSE
                 WS(1) = 0
   30          ENDIF
               RETURN
            END IF C
      C Compute output value
   35 C
            IF (ICALL .EQ. 0 .OR. ICALL .EQ. 4) THEN IF (VF_STAR .LT. 0.0) THEN
                 VF_0 = -VF_STAR
                 LF_0 = 0.0
   40            VF   = 0.0
               ELSE IF (VF_STAR .GT. 1.0) THEN
                 VF_0 = 0.0
                 LF_0 = VF_STAR - 1.0
                 VF   = 1.0
   45          ELSE
                 VF_0 = 0.0
                 LF_0 = 0.0
                 VF   = VF_STAR
               ENDIF 50       END IF
      C
      C Compute d(OUTPUT)/d(INPUT)
      C
            IF (ICALL .EQ. 3 .OR. ICALL .EQ. 4) THEN
```

ASP96-01pA

-46-

```
         IF (VF_STAR .LT. 0.0 + WS(1)*RUNTOL) THEN
            DERIV (1, 1) = -1.0
            DERIV (2, 1) =  0.0
            DERIV (3, 1) =  0.0
 5          WS(1)        =  1.0
         ELSE IF (VF_STAR .GT. 1.0 - WS(2)*RUNTOL) THEN
            DERIV (1, 1) =  0.0
            DERIV (2, 1) =  0.0
            DERIV (3, 1) =  1.0
10          WS(1)        =  1.0
         ELSE
            DERIV (1, 1) =  0.0
            DERIV (2, 1) =  1.0
            DERIV (3, 1) =  0.0
15          WS(1)        =  0.0
         ENDIF
      END IF
C
C  End
20 C
      RETURN
      END
```

Equivalents

Those skilled in the art will recognize or be able to ascertain using no more than routine experimentation, many equivalents to the specific embodiments of the invention described specifically herein. Such equivalents are intended to be encompassed in the scope of the claims.

We claim:

1. In a digital processor, a method for simulating and optimizing a plant model, the plant model having a multiplicity of equipment models for a desired processing plant and a multiplicity of local property models for the material components within the plant, comprising the steps of:
   a) providing a set of initial values for each unknown variable in the plant model in a data storage area;
   b) determining by the digital processor a first set of coefficients in each local property model based on the set of initial values;
   c) storing the coefficients in the data storage area;
   d) executing simultaneously, in an outer level routine of a simulation routine, by the digital processor, a single, unchanging set of equations representing the equipment models and local property models, wherein said single set of equations is based upon a calculation of integration over time and includes a complementarity flash formulation, and wherein said single set of equations is simultaneously valid in all regions of a solution regardless of the state of the solution, by using the first set of coefficients to determine a second set of values for the plant model;
   e) storing the second set of values for the plant model in the data storage area;
   f) determining by the digital processor a second set of coefficients in each set of local property model; and
   g) storing the second set of coefficients in the data storage area.

2. The method of claim 1 wherein the steps d through g are repeated until the change in the values of the coefficients in the local property models is within a predetermined tolerance.

3. The method of claim 1 wherein the initial values include pressure, temperature and composition.

4. In a digital processor, a method for simulating and optimizing a plant model, the plant model having a multiplicity of equipment models for a desired processing plant and a multiplicity of local property models for the material components within the plant, comprising the steps of:
   a) providing a set of initial values for each unknown variable in the plant model in a data storage area;
   b) determining by the digital processor a first set of coefficients in each local property model based on the set of initial values;
   c) storing the coefficients in the data storage area; and
   d) executing simultaneously, in an outer level routine of a simulation routine, by the digital processor, a single, unchanging set of equations representing the equipment models and local property models, wherein said single set of equations is based upon a calculation of integration over time and includes a complementarity flash formulation, and wherein said single set of equations is simultaneously valid in all regions of a solution regardless of the state of the solution, by using the first set of coefficients to determine a second set of values for the plant model.

5. In a digital processor, a method for simulating a dynamic plant model, the plant model having a multiplicity of equipment models for a desired processing plant and a multiplicity of local property models for the material components within the plant, comprising the steps of:
   a) providing a set of initial values for each unknown variable in the dynamic plant model in a data storage area;
   b) determining by the digital processor a first set of coefficients in each local property model based on the set of initial values;
   c) storing the coefficients in the data storage area;
   d) executing simultaneously, in an outer level routine of a simulation routine, by the digital processor, a single, unchanging set of equations representing the equipment models and local property models, wherein said single set of equations is based upon a calculation of integration over time and includes a complementarity flash formulation, and wherein said single set of equations is valid in all regions of a solution regardless of the state of the solution, by using the previous set of coefficients to integrate the plant model over an incremental time period;
   e) storing the new set of values for the plant model in the data storage area;
   f) determining by the digital processor a new set of coefficients in each set of local property models; and
   g) storing the new set of coefficients in the data storage area; and
   h) repeating steps d through g until a desired simulation time period has elapsed for simulating the dynamic plant model.

* * * * *